(12) United States Patent
Kochman et al.

(10) Patent No.: US 6,563,094 B2
(45) Date of Patent: May 13, 2003

(54) SOFT ELECTRICAL HEATER WITH CONTINUOUS TEMPERATURE SENSING

(75) Inventors: Arkady Kochman, Highland Park, IL (US); Dmitry Kochman, Vernon Hills, IL (US)

(73) Assignee: Thermosoft International Corporation, Buffalo Grove, IL (US)

( * ) Notice: Subject to any disclaimer, the term of this patent is extended or adjusted under 35 U.S.C. 154(b) by 0 days.

(21) Appl. No.: 10/075,273

(22) Filed: Feb. 15, 2002

(65) Prior Publication Data

US 2002/0117495 A1 Aug. 29, 2002

Related U.S. Application Data (63) Continuation-in-part of application No. 09/309,917, filed on May 11, 1999, now Pat. No. 6,452,138.

(51) Int. Cl.[7] .................................................. H05B 3/34
(52) U.S. Cl. ........................................ 219/549; 219/529
(58) Field of Search ........................... 219/520, 527–529, 219/538, 539, 542, 545, 548, 549, 200, 201, 212, 211; 174/107; 337/159, 293, 295

(56) References Cited

U.S. PATENT DOCUMENTS

| | | | |
|---|---|---|---|
| 1,703,005 A | | 2/1929 | Hewitt |
| 2,496,279 A | | 2/1950 | Ely et al. |
| 2,820,085 A | * | 1/1958 | Crowley ..................... 219/538 |
| 3,349,359 A | | 10/1967 | Morey |
| 3,385,959 A | | 5/1968 | Ames et al. |
| 3,627,981 A | | 12/1971 | Kuhn |
| 3,657,516 A | | 4/1972 | Fujihara |
| 3,774,299 A | | 11/1973 | Sato et al. |
| 3,808,403 A | | 4/1974 | Kanaya et al. |
| 3,825,870 A | * | 7/1974 | Ono et al. ................... 337/159 |
| 3,935,422 A | | 1/1976 | Barnes et al. |
| 4,051,094 A | | 9/1977 | Reuter et al. |
| 4,149,066 A | | 4/1979 | Niibe |
| 4,250,397 A | | 2/1981 | Gray |
| 4,309,596 A | | 1/1982 | Crowley |
| 4,523,086 A | | 6/1985 | Eilentropp |
| 4,538,054 A | | 8/1985 | De La Bretoniere et al. |
| 4,713,531 A | | 12/1987 | Fennekels et al. |
| 4,742,212 A | * | 5/1988 | Ishii et al. .................. 219/549 |
| 4,764,665 A | | 8/1988 | Orban et al. |
| 4,792,662 A | | 12/1988 | Kitagaki et al. |

(List continued on next page.)

FOREIGN PATENT DOCUMENTS

| | | |
|---|---|---|
| DE | 21 48 191 A | 4/1973 |
| DE | 32 33 904 A | 3/1984 |
| DE | 32 43 061 A | 5/1984 |
| FR | 2 323 289 A | 4/1977 |
| GB | 1 243 898 A | 8/1971 |
| WO | WO 95 33358 A | 12/1995 |
| WO | WO 98 01009 A | 1/1998 |
| WO | WO 98 09478 A | 3/1998 |

*Primary Examiner*—Tu Ba Hoang
(74) *Attorney, Agent, or Firm*—Liniak, Berenato & White (57) ABSTRACT

A soft and flexible heater utilizes electrically conductive threads or fibers as heating media. The conductive fibers are encapsulated by insulating materials, forming continuous heating cables. One or more heating cables can be formed into heaters of various configurations including tapes, sleeves or sheets. Such heaters may be connected in different combinations, in parallel or in series. The heater may contain continuous temperature sensors to prevent overheating and fire. Such temperature sensors can be made of electrically conductive fibers, metal wires or fiber optical filaments. When required by the heater design, the electrically conductive threads/fibers may have a polymer base, which acts as a Thermal-Cut-Off (TCO) at predetermined temperatures. Electrically conductive fibers comprised of such polymer base can melt between 120° C. and 350° C. thereby terminating electrical continuity in the heater.

28 Claims, 6 Drawing Sheets

U.S. PATENT DOCUMENTS

| | | |
|---|---|---|
| 4,825,049 A | 4/1989 | Rickborn |
| 4,969,840 A | 11/1990 | Ii et al. |
| 4,983,814 A | 1/1991 | Ohgushi et al. |
| 5,023,433 A | 6/1991 | Gordon |
| 5,068,518 A | 11/1991 | Yasuda |
| 5,298,722 A | 3/1994 | Tanaka |
| 5,412,181 A | 5/1995 | Giamati |
| 5,643,480 A | 7/1997 | Gustavsson et al. |
| 5,801,914 A | 9/1998 | Thrash |
| 5,824,996 A | 10/1998 | Kochman et al. |
| 6,031,214 A | 2/2000 | Bost et al. |

\* cited by examiner

SOFT ELECTRICAL HEATER WITH CONTINUOUS TEMPERATURE SENSING

This is a continuation-in-part of application Ser. No. 09/309,917 filed on May 11, 1999, now U.S. Pat. No. 6,452,138.

BACKGROUND OF INVENTION

1. Field of Invention

This invention relates to soft and flexible electrical heaters, and particularly to heating elements, which have soft and strong metal or carbon containing electrically conductive textile threads/fibers.

2. Description of the Prior Art

Heating elements have extremely wide applications in household items, construction, industrial processes, etc. Their physical characteristics, such as thickness, shape, size, strength, flexibility and other characteristics affect their usability in various applications.

Numerous types of thin and flexible heating elements have been proposed. For example, U.S. Pat. No. 4,764,665 to Orban et al. discloses an electrically heated fabric for use in gloves, airfoils and aircraft parts. In this patent the fabric is metallized after being formed in a glove structure, following weaving or arranging in a non-woven format. Copper bus bars are utilized for introduction of electrical current to the metallized textile. Having been made of a solid piece of fabric with metallized coating, this heating element does not allow for flexibility in selection of desired power density. Furthermore, the metallizing of the formed heating element results in a loss of significant economies of scale; only a small number of embodiments can be achieved, thus severely limiting the potential application of this invention. The '665 design is also not conducive to tight hermetic sealing throughout the heater areas (no gaps inside), which can increase the possibility of a short circuit through puncture and admission of liquid into the body of the heating element. In addition, this element cannot be used with higher temperatures due to the damage that would be caused to the polyaramid, polyester or cotton metallized fabric, described in the invention.

Another prior art example is U.S. Pat. No. 4,713,531 to Fennekels et al. Fennekels et al. discloses a sheet textile structure having resistance elements combined with it. These resistance elements comprise metallic fibers or filaments with a denier like that of natural or synthetic textile fibers, and with overall cross sectional thickness of 8 to 24 microns. The '531 design suffers from the following drawbacks: (a) being a sheet product, it is not conducive to hermetic sealing throughout the body of the heater (no gaps inside); only perimeter sealing is possible, which can increase the possibility of a short circuit due to puncture and admission of liquid into the body of the heating element; (b) yarns, comprising metal fibers, lack consistency of electrical resistance per given length, and their stretching, compression, or both, will result in very wide fluctuations in resistance, thus limiting the use of this technology for embodiments controlled by strict design and where uncontrollable power output and temperature variability are unacceptable; (c) yarns are very heavy: from 1 to 7 grams per 1 meter of yarn; (d) the use of silver fibers makes these yarns very expensive; (e) individual conductors have a large cross sectional thickness, each having an outer sheath of braided textile or elastomer.

Another prior art example is U.S. Pat. No. 4,538,054 to de la Bretoniere. The heating element of de la Bretoniere '054 suffers from the following drawbacks: its manufacturing is complex requiring weaving of metal or carbon fibers into non-conductive fabric in a strictly controlled pattern; the use of the metal wire can result in breakage due to folding and crushing and the use of metal wires affects the softness, weight and flexibility of the finished heater; it can not be manufactured in various shapes, only a rectangular shape is available; only perimeter sealing is possible (no gaps inside), which can result in a short circuit due to puncture and admission of a liquid into the body of the heating element; the method of interweaving of wires and fibers does not result in a strong heating element, the individual wires can easily shift adversely affecting the heater durability; the fabric base of the heating element is flammable and may ignite as a result of a short circuit; it is not suitable for high temperature applications due to destruction of the insulating weaving fibers at temperatures exceeding 120° C.

A heating element proposed by Ohgushi (U.S. Pat. No. 4,983,814) is based on a proprietary electro conductive fibrous heating element produced by coating an electrically nonconductive core fiber with electro conductive polyurethane resin containing the carbonatious particles dispersed therein. Ohgushi's manufacturing process appears to be complex; it utilizes solvents, cyanides and other toxic substances. The resulting heating element has a temperature limit of 100° C. and results in a pliable but not soft heating element. In addition, polyurethane, used in Ohgushi's invention, when heated to high temperature, will decompose, releasing very toxic substances, such as products of isocyanides. As a consequence, such heating element must be hermetically sealed in order to prevent human exposure to toxic off gassing. Ohgushi claims temperature self limiting quality for his invention, however "activation" of this feature results in the destruction of the heater. He proposes the use of the low melting point non-conductive polymer core for his conductive fabric-heating element, which should melt prior to melting of the conductive layer, which uses the polyurethane binder with the melting point of 100° C. Thus, the heating element of Ohgushi's invention operates as Thermal Cut Off (TCO) unit, having low temperature of self destruction, which limits its application.

U.S. Pat. No. 4,149,066 to Niibe et al. describes a sheet-like thin flexible heater made with an electro-conductive paint on a sheet of fabric. This method has the following disadvantages: the paint has a cracking potential as a result of sharp folding, crushing or punching; the element is hermetically sealed only around its perimeter, therefore lacking adequate wear and moisture resistance; such an element can't be used with high temperatures due to destruction of the underlying fabric and thermal decomposition of the polymerized binder in the paint; the assembly has 7 layers resulting in loss of flexibility and lack of softness.

The present invention seeks to alleviate the drawbacks of the prior art and describes the fabrication of a heater comprising metal fibers, metal wires, metal coated, carbon containing or carbon coated threads/fibers, which is economical to manufacture; does not pose environmental hazards; results in a soft, flexible, strong, thin, and light heating element core, suitable for even small and complex assemblies, such as hand wear. A significant advantage of the proposed invention is that it provides for fabrication of heaters of various shapes and sizes with predetermined electrical characteristics; allows for a durable heater, resistant to kinks and abrasion, and with electro-physical properties that are almost unaffected by application of pressure, sharp folding, small perforations, punctures and crushing. A preferred embodiment of the invention consists of utilizing electrically conductive textile threads/fibers having a Thermal Cut Off (TCO) function to prevent overheating and/or fire hazard. The heaters described in this invention may also comprise a continuous temperature sensor to control heating power output in the heating product.

SUMMARY OF THE INVENTION

The first objective of the invention is to provide a significantly safe and reliable heater which can function properly after it has been subjected to sharp folding, kinks, small perforations, punctures or crushing, thereby solving problems associated with conventional flexible metal wire heaters. In order to achieve the first objective, the heater of the present invention may comprise (A) electrically conductive threads/fibers and (B) multi-layer insulation of the conductive threads/fibers. The conductive threads/fibers may be comprised of carbon, metal fibers, textile threads coated with one or combination of the following materials: metal, carbon and/or electrically conductive ink. The proposed heater may also comprise metal wires and their alloys. The electrically conductive textile threads/fibers may possess the following characteristics: (i) high strength; (ii) high strength-to-weight ratio; (iii) softness and flexibility. The beating element core described in this invention is comprised of electrically conductive tapes, sleeves, sheets or cables, which radiate a controlled heat over the entire heating core surface. The multi-layer insulation of the electrically conductive threads/fibers provides increased dielectric properties, preventing or minimizing current leakage in the event of abuse of the heater. The multi-layer insulation may be applied in the form of encapsulation (through extrusion process) or lamination with insulating synthetic materials, having similar or different thermal characteristics.

A second objective of the invention is to provide maximum flexibility and softness of the heating element. In order to achieve the second objective, the electric heating element of the invention may contain thin (0.01 to 3.0 mm, but preferably within the range of 0.05–1.0 mm) conductive threads/fibers, which are woven, non-woven, knitted or stranded into continuous or electrically connected tapes, sleeves/pipes, cables or sheets. Another preferable configuration may consist of extruding soft insulating material, such as, but not limited to polyvinyl chloride (PVC), polyurethane, nylon, polypropylene, temperature resistant rubber, cross-linked PVC or polyethylene around a multitude of electrically conductive textile thread/fibers.

A third objective of the invention is to provide for the uniform distribution of heat, without overheating and hot spots, thereby preventing excessive insulation and improving energy efficiency. In order to achieve this objective (a) conductive threads in the heating elements may be separated by non-conductive fibers/yarns or insulating polymers, (b) one side of the heating element may include a metallic foil or a metallized material to provide uniform heat distribution and heat reflection. It is also preferable that the soft heating elements of the invention are made without thick cushioning insulation, which slows down the heat delivery to the surface of the heating unit.

A forth objective of the invention is to provide for ease in the variation of heating power density, thereby solving a problem of manufacturing various heating devices with different electric power density requirements. In order to achieve the forth objective, the electrically conductive textile threads/fibers or metal wires may be insulated by a polymer, creating multiple thin cables, which then may be laminated or sandwiched between woven or non-woven fabric or sheets, knitted, or interwoven with nonconductive threads into heating strips, sleeves/pipes or sheets with predetermined width, density of weaving and thickness. It is preferable that the heating strips and sleeves/pipes, sheets are made of a combination of threads/fibers with different electrical resistance and which may include electrically nonconductive high strength polymer or inorganic (such as refractory ceramic or fiberglass) fibers.

A fifth objective of the invention is to provide a high level of temperature control. In order to achieve the fifth objective, the following materials may be applied: (A) at least one electrically conductive textile thread or fiber, running throughout the heater acts as a temperature sensor and when connected to an electronic power control regulator, activates such electronic power control regulator by a change of electrical resistance or current; (B) at least one fiber optical filament, running throughout the heater acts as an infrared wave temperature sensor. Such infrared wave temperature sensor is connected to an electronic device, which converts infrared wave signals into electrical signals. These electrical signals trigger a power control regulator to adjust or terminate its electrical power output; (C) a power control regulator is set for periodic ON/OFF cycling to minimize temperature build-up in the heater; (D) the power control regulator is set to a predetermined power level and/or power shut-off in a predetermined period of time.

A sixth objective of the invention is to provide a high level of safety, minimizing the possibility of fire hazard. In order to achieve the sixth objective: (A) multiple thin heating cables may be reinforced by strong and flame retardant threads/fibers, (B) the conductive media of the heating cables may comprise metal or carbon containing electrically conductive textile threads/fibers with polymer base having a melting temperature t from 120° C. to 350° C. The melting of the conductive threads/fibers causes terminating of electrical continuity in the heating system. Thus the proposed heating cables can operate as a high temperature melting fuse or TCO (Thermal-Cut-Off) device, and (C) the electrically conductive threads/fibers, having a melting temperature from 120° C. to 350° C., may be encapsulated by at least two layers of insulation, providing that the outer insulation layer has a higher melting temperature than the inner insulating layer(s). Use of the outer insulating layer with a higher melting temperature prevents melting of the outer insulation in the event the electrically conductive textile threads/fibers reach their melting temperature (between 120° C. to 35° C.), thereby terminating electrical continuity in the heater.

A seventh objective of the invention is to provide simple and efficient control of the power output of the heating element. In order to achieve the seventh objective, the heating element, such as heating tape, may be comprised of multiple cables electrically connected in parallel to a power control switch. Variation in the power output may be achieved by switching between one cable to a combination of two or more heating cables.

The present invention comprises a heating element containing soft, strong and light electrically conductive textile threads/fibers acting as a heating means. The heating element is highly resistant to punctures, cuts, small perforations, sharp folding and crushing. It can be manufactured in various shapes and sizes, and it can be designed for a wide range of parameters, including but not limited to input voltage, temperature, power density, type of current (AC or DC) and method of electrical connection (parallel or in series). The heating element preferably consists of nonconductive fibers/yarns or insulating polymers which are combined with electrically conductive individually insulated metal or carbon containing threads/fibers by knitting, weaving into or, laminating between layers of woven or nonwoven fabric or sheeting, forming tapes, sleeves/pipes or sheets.

Selected areas of the heating element core may contain electrically conductive textile fibers, fiber optical filaments, or wires to provide sensing of electrical resistance or heat radiation. The heating element core may be shaped by folding, turning, stitching, fusing, laminating or by any other appropriate assembling technique to obtain the predetermined configuration of the heater. The electrical terminals, such as connector pins, crimps or electrodes may be attached to ends of said heating element core. The electrically conductive textile fibers may be electrically connected in parallel or in series. In the event of utilizing alternating current, the individually insulated cables in the heating element core may be connected in such a way as to minimize electromagnetic field (EMF). The following are some of the methods for reducing/eliminating EMF in the preferred embodiments of the invention:

(a) Utilizing of a voltage step-down transformer;
(b) Utilizing of a voltage step-down transformer and rectifier;
(c) Utilizing of an AC to DC rectifier with or without filtering capacitor;
(d) Providing of simultaneous opposite current flow in the individually insulated cables of the heating element.

DETAILED DESCRIPTION OF THE INVENTION

The invention consists of a soft heating element core made by interconnecting conductive metal and/or carbon containing threads/fibers with nonconductive yarns/fibers or polymers. Said core may be assembled as individual cables, tapes, sleeves/pipes or sheets. The heating element core may contain, electrically conducting metal fibers, metal coated and/or carbon containing threads, which may be combined with non-conducting yarns/fibers or polymers in various proportions and/or weaving/knitting or non-woven patterns in order to augment the heating element core electrical resistance.

The term "heater" described in this invention shall mean any electrical heat radiating device comprising at least one of the following parts: (a) round or flat cable, (b) tape, (c) sheet, or (d) sleeve.

For convenience of explanation of the invention, the term "thread" shall mean stitching thread, knitting thread, and/or weaving thread or yarn.

The term "metal fibers" shall mean metal fibers/filaments, having a denier size of synthetic textile fibers. The diameter of each metal fiber is smaller than the lowest commercially available metal wire Gauge. An example of metal fibers may be Bekinox® stainless steel continuous filament/fiber yarn, manufactured by Bekaert Corporation.

The term "metal wire" shall mean at least one continuous metal strand having a diameter greater than the individual metal fiber/filament described above. The metal wire may contain one or a combination of the following metals: copper, iron, chromium, nickel, silver, tin and gold. The metal wire may be in the form of a thin wire wound around a nonconductive fiber core. As an example, the metal wire may be in a form of a silver coated continuous copper strand, wound around a continuous fiberglass core. Such metal wire may be used as an electrical bus conductor in a low voltage parallel assembly or may be used as a flexible heater itself. It may also be used as a temperature sensor electrically connected to a power control regulator.

The term "carbon containing fibers" or "carbon containing threads" described in this invention shall mean textile fibers, comprising at least one of the following materials: (a) carbon/graphite threads/fibers, (b) textile fibers/threads, which contain carbon or graphite particles inside the polymer fibers, or (c) synthetic polymer or ceramic fibers/threads coated or impregnated with carbon or carbon/graphite containing material.

The term "conductive textile" described in this invention shall mean soft electrically conductive textile material comprising electrically conductive threads/fibers with or without inclusion of nonconductive materials, such as, laminated, stranded, knitted, woven or non-woven fibers.

The term "electrically conductive textile fibers" described in this invention shall mean textile threads/fibers or filaments, comprising electrically conductive materials. Electrically conductive textile threads or fibers may be made completely of electrically conductive fibers, such as metal fibers or carbon/graphite fibers. Electrically conductive textile fibers may be comprised of nonconductive fibers or particles combined with electrically conductive fibers, particles or layers of electrically conductive coating.

The term "metal coated threads" described in this invention shall mean electrically conductive textile threads or fibers, coated by at least one of the following highly electrically conductive metals: silver, gold, copper, tin, nickel, zinc, palladium, their alloys or multi-layer combination. Such coating may be applied on carbon/graphite threads, extruded polymer filaments, synthetic threads/fibers, fiberglass or ceramic threads/fibers by sputtering, electroplating, electroless deposition or by any other appropriate metal coating or impregnation technique.

The term "melting fuse" or "fuse" described in this invention shall mean electrically conductive textile fibers which melt at the temperatures between 120° C. and 350° C. Such melting results in termination of the electrical continuity in said electrically conductive textile fibers.

The term "shape holding means" described in this invention shall mean any method or device, which provides reliable fastening of the electrically conductive textile fibers in a predetermined configuration. As an example, such shape holding means may comprise gluing, thermal fusing, laminating, stitching, embroidering, riveting, stapling, ultrasonic or infrared frequency quilting or any other appropriate technique for attaching flexible materials.

The term "nonconductive means" described in this invention shall mean any electrically nonconductive material, which can provide electrical insulation between electrically conductive textile fibers. Such nonconductive means may be comprised of weaving yarns, knitted threads/fibers, extruded or jacketed insulating polymer, knitted, woven or non-woven synthetic fabric or inorganic fibers/textile.

The term "insulating layer" described in this invention shall mean a layer of nonconductive means, which insulates at least portions of electrically conductive textile in the heater. Such insulating layer may be in the form of extruded or jacketed polymer, thermoplastic or textile sheet, sleeve, or strip of nonconductive means. The insulating layer may comprise polyvinyl chloride (PVC), silicon rubber, polyethylene, polypropylene, polyurethane, crosslinked polyethylene and PVC, or other appropriate electrical insulating materials.

The term "gap", described in this invention shall mean a space filled with nonconductive media, which may comprise polymer, air, ceramic or synthetic textile fibers. The gap usually separates portions of electrically conductive materials in a predetermined pattern.

The term "heating means" described in this invention shall mean electrically conductive material, which provides heat radiation upon application of sufficient voltage to the heater. As an example, the electrically conductive textile fibers or metal wires may be heating means.

The term "heating cable" described in this invention shall mean electrically conductive textile fibers, employed as a heating means, encapsulated by at least one insulating layer of nonconductive means.

The term "power control regulator" described in this invention shall mean electrical power control device, which provides sensing and/or variation of heat radiation in the heater. The power control regulator may contain electronic components or may be a simple mechanical switch, which alternatively connects single or multiple heating cables in different combinations. Usually, the power control regulator is located between the electrical power source and the heating means. However, it may be also designed as a wireless remote controller with the receiver/regulator located between the electrical power source and the heater.

The term "temperature sensor" described in this invention shall mean at least one of the following materials, which provide temperature sensing in the heater: (a) electrically conductive textile fiber, (b) metal wire, (c) electrically conductive polymer, or (d) fiber optical filament. Such temperature sensor is usually disposed in close proximity to the heating means and provides temperature sensing by (a) a change in electrical resistance of the electrically conductive textile fibers or wires due to a temperature change in the heater, or (b) transferring of infrared wave signal based on temperature change, through at least one fiber optical filament, to an electronic receptor which converts the infrared wave signal to an electrical signal. The temperature sensor is always connected to a power control regulator, which varies or terminates electrical power supply to the heater. The temperature sensor may be encapsulated by a nonconductive material or it may be free of any insulation.

The term "temperature sensing heating cable" described in this invention shall mean heating cable, which contains a temperature sensor inside of such heating cable. If dictated by the heater design, the temperature sensing heating cable comprises electrically conductive textile fibers, as heating means, which are separated from the temperature sensor by at least one insulating layer. However, in the temperature sensing heating cable, the electrically conductive textile fibers may be used as a heating means and a temperature sensor at the same time. The fiber optical filament, utilized as a temperature sensor in the temperature sensing heating cable, may not be insulated from the heating means.

The term "heating tape" described in this invention shall mean a heater having a form of a flexible tape, where tape means a long narrow, flexible strip of material or fabric. Such tape has a width significantly smaller than its length. The heating tape may be comprised of insulated or non-insulated electrically conductive textile fibers. It may also comprise nonconductive means to insulate or separate the electrically conductive textile fibers.

The term "heating sheet" described in this invention shall mean a heater having a form of a sheet, where sheet means a broad surface of material or fabric. The heating sheet may be comprised of insulated or non-insulated electrically conductive textile fibers combined with fabric or polymer material. Such heating sheet may contain weaving fibers/threads, knitted fibers/threads, extruded or molded polymer, knitted, woven or non-woven synthetic or inorganic filaments, threads or textile.

The term "heating sleeve" described in this invention shall mean a heater having a form of a sleeve or tubular cover of continuous cross section. The heating sleeve may be comprised of insulated or non-insulated electrically conductive textile fibers combined with fabric or polymer material. The heating sleeve may contain weaving yarns, knitted yarns, extruded or molded polymer, knitted, woven or non-woven synthetic or inorganic fibers, threads or textile.

The term "conductive ink" described in this invention shall mean electrically conductive ink, paint and/or adhesive comprising electrically conductive media, such as carbon, graphite or metal particles/fibers dispersed in a solution of organic material.

The heater described in this invention may comprise one of the following textile threads/fibers, fiber optical filaments, metal wires or their combination:

1. Metal coated threads, containing synthetic polymer, with similar or varying electrical characteristics.
2. Metal coated threads, made of ceramic or fiberglass fibers, with similar or varying electrical characteristics.
3. Carbon/graphite or carbon coated threads, made of ceramic or fiberglass fibers with similar or varying electrical characteristics.
4. Electrically conductive textile fibers with similar or varying electrical characteristics, impregnated with conductive ink.
5. Metal threads made of metal fibers with similar or varying electrical characteristics.
6. Metal wires with similar or varying electrical characteristics.
7. Carbon containing threads or fibers.
8. Threads/wires, as indicated in 1 through 7 above, with the addition of nonconductive polymer synthetic fibers.
9. Threads/fibers, as indicated in 1 through 8 above, with the addition of nonconductive inorganic fibers, including fiberglass.
10. Threads/fibers, as indicated in 1 through 9 above, with the addition of metal wires or electrically nonconductive fiber optical filaments as temperature sensors.

The combining of the cables with the non-conductive substrate may be achieved by placing the cables between at least two layers of non-conductive material and subsequent thermal fusing/quilting of the sandwich assembly. It is also possible to utilize adhesive to laminate or to sandwich heating cables and optional nonconductive threads/fibers between nonconductive materials.

Figures 1A, 1B, 1C:
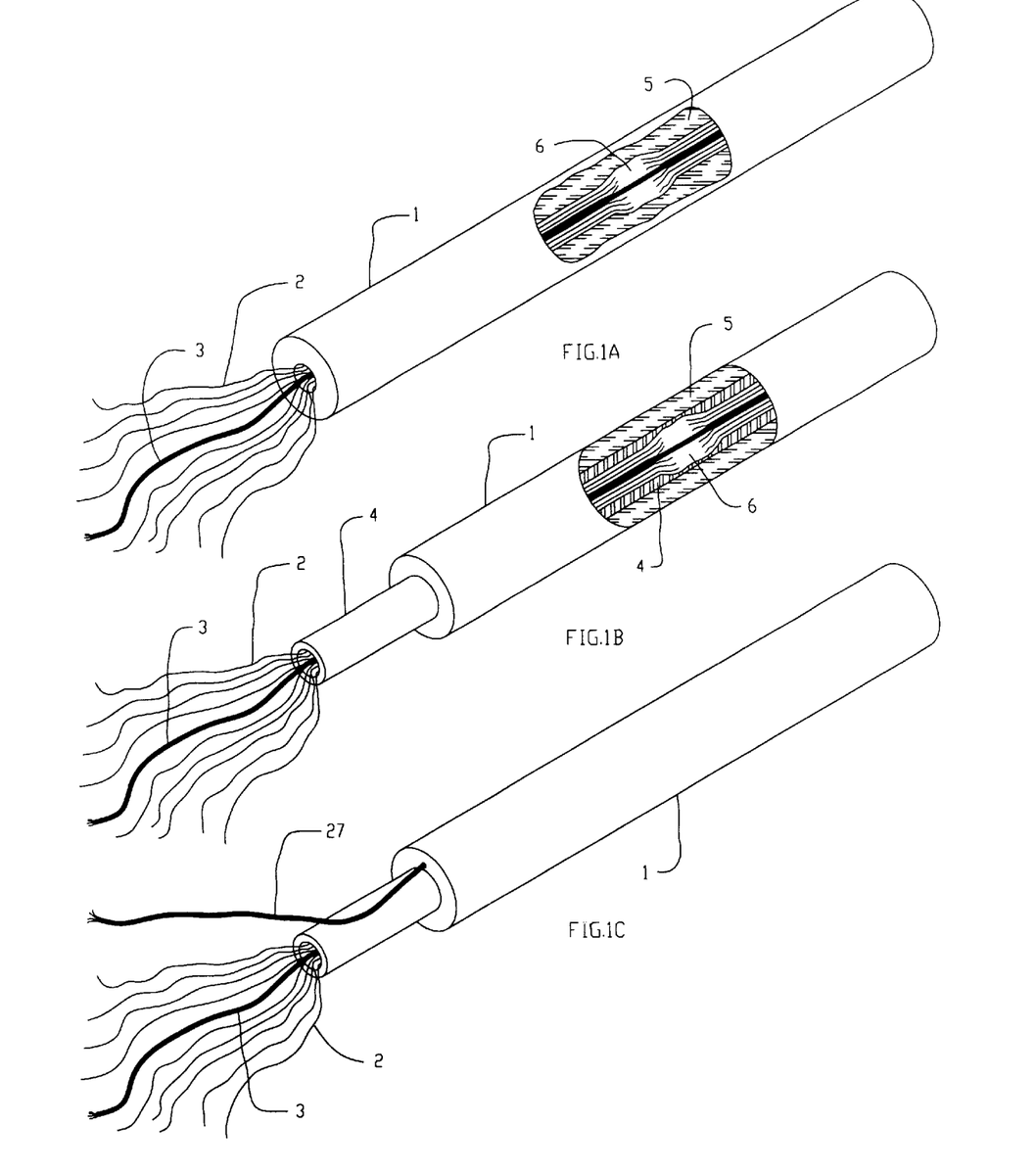
FIG. 1A shows an isometric view of a heating cable consisting of electrically conductive textile fibers encapsulated by one layer of nonconductive means.
FIG. 1B shows an isometric view of a heating cable consisting of electrically conductive textile fibers encapsulated by two layers of nonconductive means with different melting points.
FIG. 1C shows an isometric view of a temperature sensing heating cable consisting of electrically conductive textile fibers, two layers of nonconductive means, and a temperature sensor, located in the insulating layers.

The preferred embodiment of the invention shown in FIG. 1A consists of a soft and flexible heating cable (1), comprising electrically conductive textile fibers (2) as heating media. These fibers (2) have a polymer base with melting temperature between 120° C. and 350° C. In the event of overheating of the heating cable, the electrically conductive textile fibers (2) can melt like a fuse in the melting zone (6), terminating electrical continuity in the heating cable. Such fusing ability of the heating electrically conductive textile fibers (2) provides inherent overheat and fire hazard protection ability to the heating element described in this invention. In general, such melting fuse acts as a continuous Thermal Cut-Off (TCO) device, which protects the system from overheating through the whole length of the heating cable. The heating cable may contain other electrically non-conductive, strength reinforcing and shape holding fibers (3). The electrically conductive textile threads are encapsulated by one layer of nonconductive means (5).

The same electrically conductive textile fibers (2) may be also used, simultaneously or alternatively, as a heating means and temperature sensor in a temperature sensing heating cable. Such temperature sensing heating cable is connected to a special power control regulator, which is designed to (a) detect a signal of temperature change in the heater and (b) to vary a power control output.

The insulation of the heating cable may consist of more than one layer of nonconductive means, as shown in FIG. 1B. An inner insulating layer (4) may consist of a polymer with the melting temperature point close to that of the electrically conductive textile fibers (2). When this layer of insulation is applied to the heating electrically conductive textile threads/fibers (2), no damage (melting) is caused. The inner insulating layer (4) can be applied by extrusion, jacketing or wrapping. The outer insulating layer (5) may have a melting point that is significantly higher than that of the melting electrically conductive textile fibers (2). The above-described application of two insulating layers is required for extruding/jacketing of polymers over conductive threads to prevent damaging the temperature sensitive electrically conductive textile threads/fibers from the high heat of the molten outer layer polymer. In the event of overheating of the heating cable, the textile melting fuse, i.e. electrically conductive textile fibers (2), and the inner layer (4) will melt in a melting zone (6), terminating electrical continuity in the heating cable and leaving the outer layer (5) intact.

The multi-layer insulation has the additional advantages of providing for better cable flexibility and reduced susceptibility to physical damage. In the multi-layer insulated cable, any crack, abrasion or other damage to the outer insulation layer has a smaller likelihood of penetrating through the inner insulating layer and to the heating fibers than in a cable with a single insulating layer.

The temperature sensing heating cables of the invention may comprise a temperature sensor (27) as an additional safety feature, as shown in FIG. 1C. Such temperature sensor may be located inside one of the insulating layers, between the layers, or on the outside of the heating cable, but, preferably, in close proximity to it. The fiber optical filaments used as a temperature sensor, may be also combined directly with the electrically conductive textile fibers inside the temperature sensing heating cable. For example, a nonconductive strengthening thread (3) may also act as a fiber optical temperature sensor. The temperature sensors are usually connected to special electrical devices, such as power control regulators, which can receive either an electrical or an infrared wave signal from the temperature sensor activated by a temperature change in the heater. The power control regulators respond to such signals by adjusting to a predetermined power level or by terminating the electrical continuity in the heater.

The heating cables (1) of the invention can be incorporated into heaters of various configurations, such as multiple cables, multi-cable heating tapes, heating sheets, modular heaters, heating sleeves, etc.

Figure 2A:
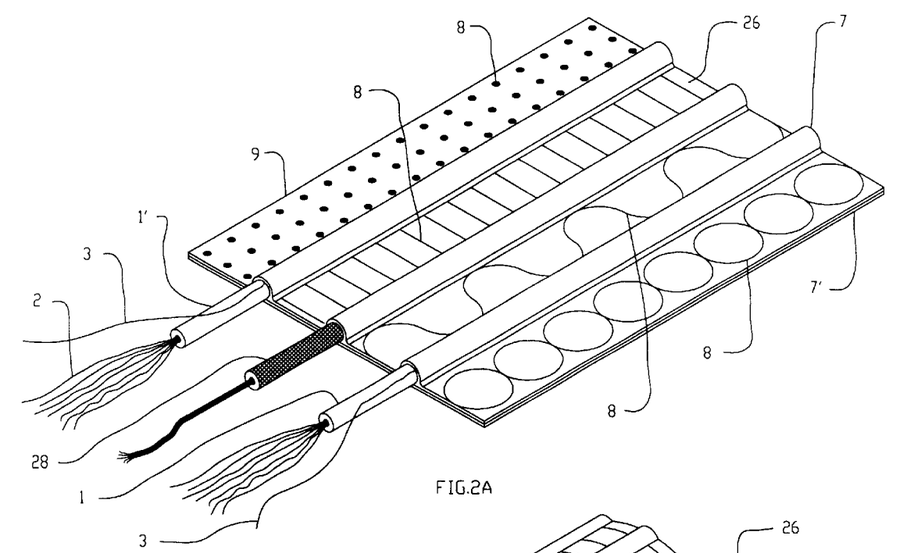
FIG. 2A shows an isometric view of a heating tape, where the heating cables of various constructions are sandwiched between two layers of nonconductive material. An optional insulated temperature sensor is shown in the middle of the heating tape.

The FIG. 2A shows a preferred embodiment of one of such heaters, which has a form of a heating tape (9). The heating tape may be formed by weaving or knitting of the heating cables (1) and (1') with electrically non-conductive threads/fibers into a tape of desired dimensions. Alternatively, the heating tape (9) may be formed by sandwiching or laminating the heating cables along with optional reinforcing fibers (3) and optional temperature sensing cable (28) between at least two layers of electrically nonconductive sheathing materials (7) and (7'). The layers of sheathing materials can be connected by various shape holding means (8) in order to sandwich and reliably hold the heating cables and optional temperature sensors. The shape holding means (8) may have different quilting, fusing or embroidering patterns as shown in the FIG. 2A. The shape holding means can create gaps (26) separating the heating cables and optional temperature sensors (28).

Figure 2B:
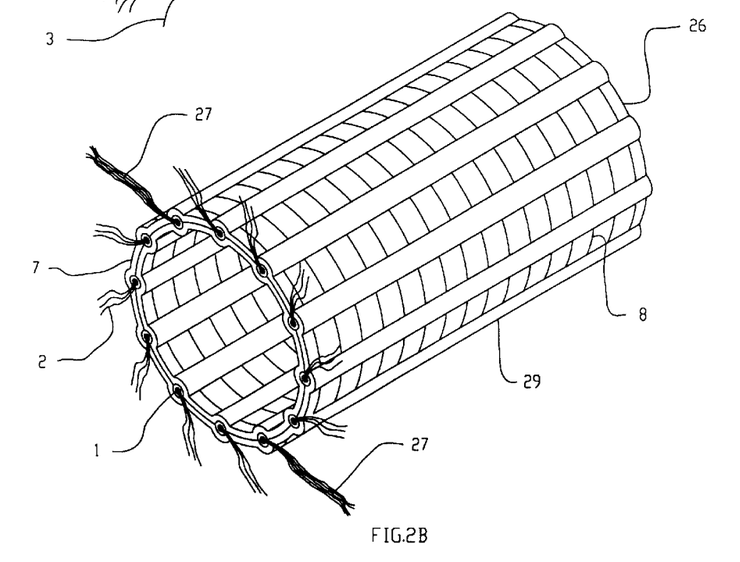
FIG. 2B shows an isometric view of a heating sleeve, where the heating cables are sandwiched between two layers of nonconductive material. Two optional insulated temperature sensors are also shown.

The FIG. 2B shows an example of a heating sleeve/pipe (29), comprising insulated electrically conductive textile fibers (2) as heating means. The optional electrically insulated temperature sensors (27) may also be included in the heating sleeve. The heating cables (1) and the insulated temperature sensors are sandwiched between the insulating layers (7) and separated by the gaps (26).

It is also possible to use the same electrically conductive textile fibers as a heating means and a temperature sensor regardless of the shape and size of the heater.

Figure 3:
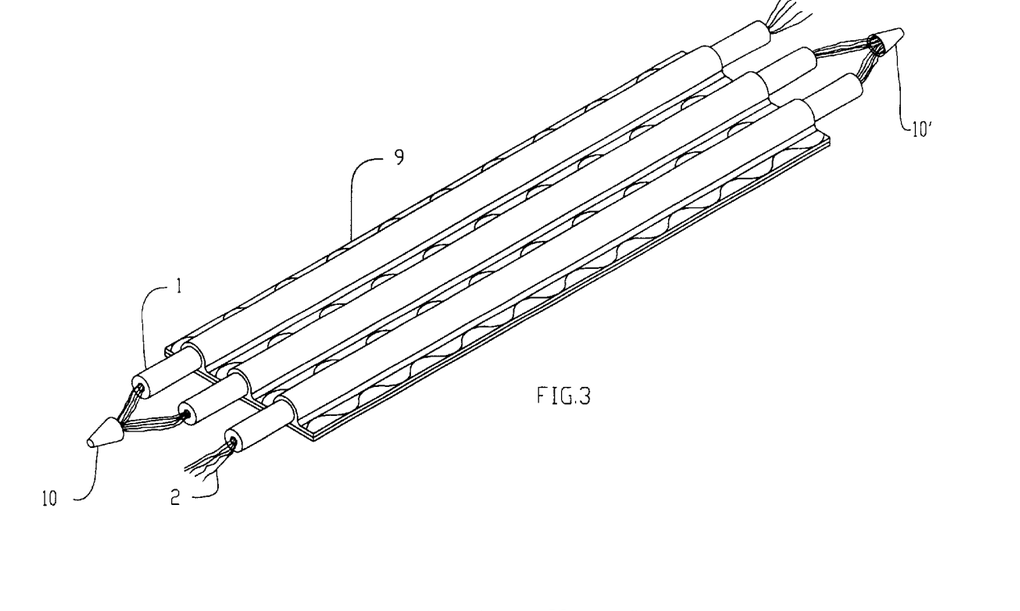
FIG. 3 shows an isometric view of a heating tape with individual heating cables electrically connected in series.

The heating cables of the present invention can be connected with each other in different cable combinations, in parallel and in series. FIG. 3 shows one of the preferred embodiments of the invention, where individual heating cables (1) are electrically connected with each other in series at the ends of the heating tape (9). Preferably, special electrode terminals (10) and (10') may be used to connect the heating cables. The possibility of utilizing series and parallel electrical connections of the heating cables in the same heating tape, heating sleeve or heating sheet, has the following advantages: (a) total electrical resistance may be increased/decreased if dictated by the heating element design, or (b) the same heating tape may be used for either high or low voltage applications, minimizing or eliminating costly and complicated electronics in the power control regulators. As an example, in the heating tape consisting of 4 heating cables, having electrical resistance of 10 Ohms each, the total power of the heating tape, shall be about 330 Wt, if the heating cables are interconnected in series and 115 Volts are applied to the heater. The same output power can be achieved if the same heating cables are electrically interconnected in parallel and 29 Volts are applied to the heater. For ease of assembly, the cables may be interconnected in the connector box or inside the power control regulator.

Figure 4A:
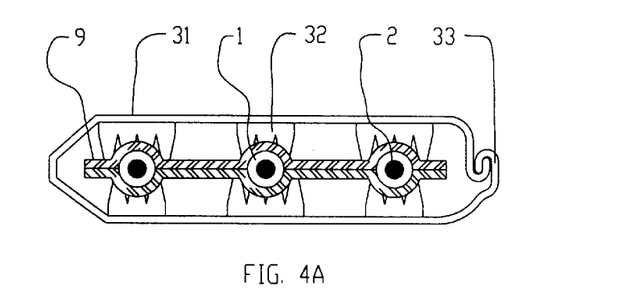
FIG. 4A shows a cross section of a front view of a heating tape including three heating cables, which are electrically connected by a metal electrode terminal. The terminal includes sharp inserts and a lock to secure electrical termination.

FIG. 4A shows cross section of an electrode terminal (31) connecting the heating tape (9), which includes insulated electrically conductive textile fibers (2). Sharp electrode inserts (32) are designed to provide reliable electrical and mechanical connection with the heating tape. The terminal lock (33) secures the closed position of the electrode terminal (31), while electrode inserts provide simultaneous electrical connection of all heating cables (1). The electrode inserts are also reliably attached to the heating tape (9), preventing it from moving inside the electrode insert (32). The shape and size of the electrode terminal, electrode inserts and the lock may vary significantly, depending on the heater design.

Figure 4B:
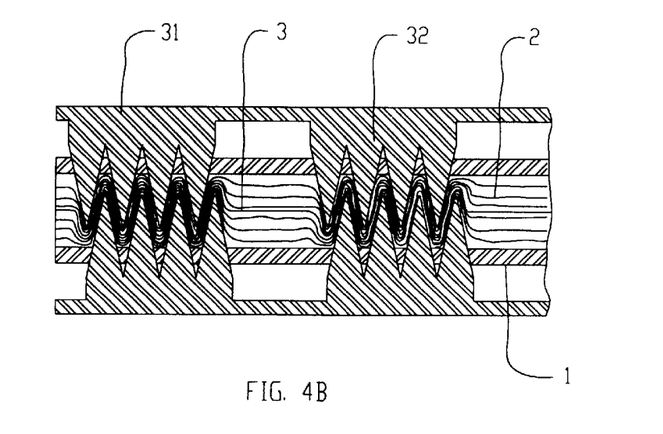
FIG. 4B shows a cross section of a side view of a heating tape including heating cables, electrically connected by a metal electrode terminal. The terminal includes sharp inserts penetrating through an electrical insulation and connecting electrically conductive textile fibers.

The FIG. 4B shows a cross section of a side view of the electrode terminal (31) with electrode inserts penetrating through the heating cable (1). Due to softness of the heating cables (1) and electrically conductive textile fibers (2), and upon applying of sufficient pressure, the electrode inserts can easily penetrate through the outer insulation of the heating cables, thus electrically connecting with electrically conductive textile fibers (2). It is important to design the electrode inserts in such a manner, so as to prevent them from damaging the heating electrically conductive textile fibers.

Figure 5A:
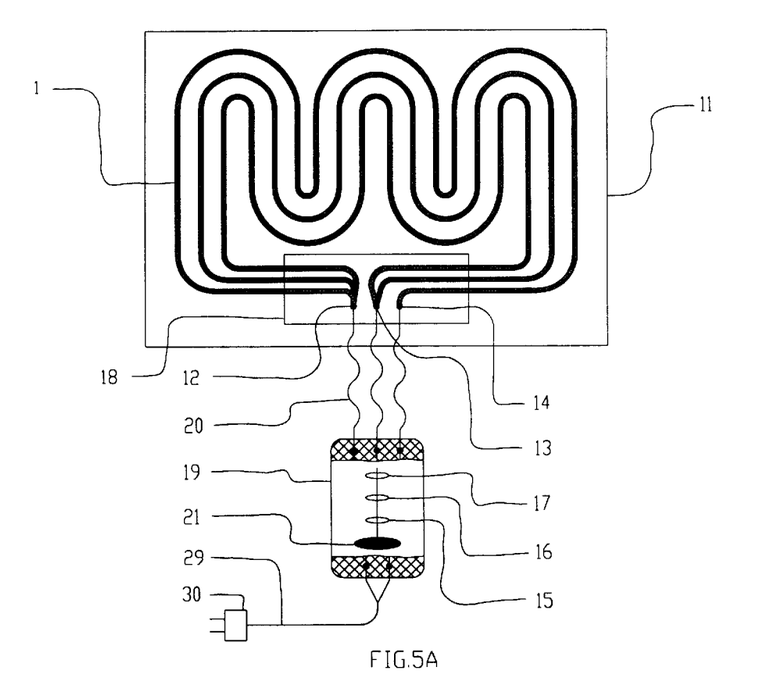
FIG. 5A shows a plan view of a power control regulator and a heating sheet, in which individual heating cables can be electrically connected to provide for power output variation through switching in various cable combinations, as a function of a power control regulator.

FIG. 5A shows an example of a heating sheet (11), connected to a power regulator (19) through the lead wire cables (20). The heating sheet consists of three heating cables (1), electrically terminated in the optional connector box (18) in such a manner, that one end of each heating cable is connected to a common terminal (12). The other ends of the heating cables are connected to the terminals (14) and (13), creating single and combined dual connections respectively. Each of the three heating cables (1) shown in FIG. 5A has the same electrical resistance. A single cable electrical connection (14) resulting in a "LOW" power output level may be achieved by shifting the switch (21) of the power control regulator to the position (15). A dual cable electrical connection (13), resulting in a "MEDIUM" power output level, may be achieved by shifting the switch (21) to the position (16). A combined three-cable electrical connection (13) and (14), resulting in a "HIGH" power output level, may be achieved by shifting the switch (21) to the position (17). It is possible to utilize an optional temperature discrete device, such as thermostats, if required by the heater design. As an example, it is preferable to utilize at least one thermostat in a therapeutic heating pad. The thermostats are usually located directly on or in a close proximity to the heating cables.

Figure 5B:
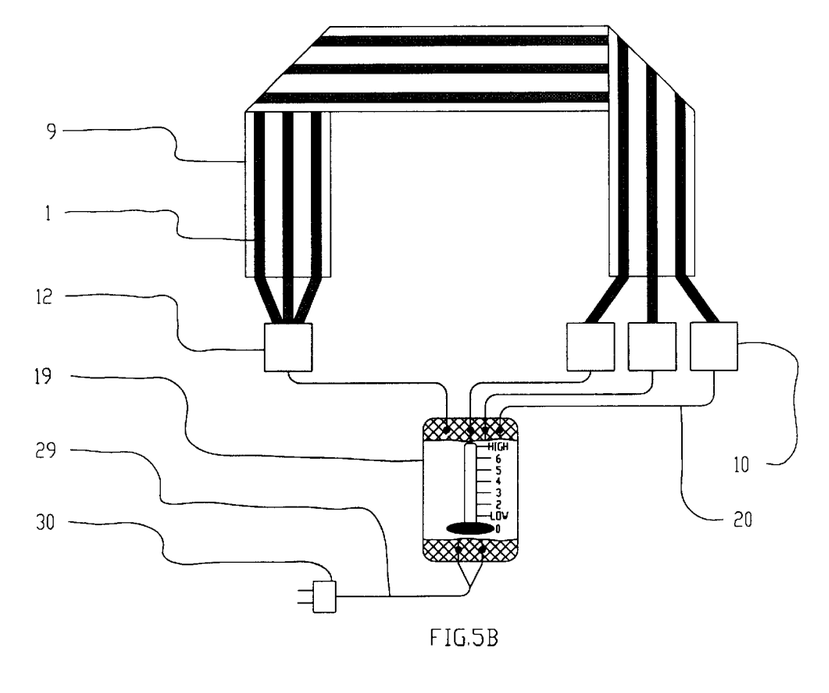
FIG. 5B shows a plan view of a power control regulator and a heating tape, in which individual heating cables can be electrically connected in various combinations, as a function of a power control regulator.

FIG. 5B shows an example of a heating tape (9), connected to a power control regulator (19) through the lead wire cables (20). The heating cables (1) in this preferred embodiment have different electrical resistance and they can be electrically connected in different single or multi-cable combinations, thus providing multiple power output levels. For example, if the first heating cable has a resistance of 10.0 Ohms, the second heating cable has a resistance of 20.0 Ohms, and the third heating cable has a resistance of 40.0 Ohms (example of binary progression), it is possible to provide up to 7 gradual power levels by switching between electrical connections of different single heating cables or their combination.

The heating cables, temperature sensing heating cables and sensors can be attached to only one layer of substrate material consisting of woven or non-woven fabric/sheeting/fibers, polymer, foil or other suitable substrate.

The proposed soft heater may be utilized in a variety of commercial and industrial heater applications, utilizing direct or alternating current. The main advantage of these heaters is the high reliability, which is provided by the tightly sealed soft and durable electrically conductive textile threads/fibers.

The process of manufacturing the heating cables, temperature sensors, temperature sensing heating cables and their assembly in the heating products can be fully automated. Some designs of the heaters may be manufactured in rolls or spools with subsequent cutting to predetermined shapes and sizes.

Further, the proposed heaters can be utilized in, but not limited to: (a) electrically heated blankets, throws, pads, mattresses, mats, bedspreads and carpets; (b) electrically heated walls, ceiling and floor electric heaters; sub flooring, office dividers/panels, window blinds, mirrors, fan blades and furniture; (c) electrically heated seats, cushions, wall, door and ceiling panels for automotive and recreational vehicles, scooters, motorcycles, boat, aircrafts, trains, trucks, busses and other transportation vehicles; (d) electrically heated safety vests, garments, boots, gloves, hats, jackets, emergency or survival wear, scuba diving suits and other apparels; (e) electrically heated food (Example: pizza) delivery bags or food storage, sleeping bags, towels, boot and glove dryers; (f) refrigerator, road, driveway, walkway, window, roof and aircraft/helicopter wing/blade deicing systems, (g) pipe line, drum and tank electrical heaters, (h) medical/health care, body/limb warmers, etc. In addition to various heating applications, the same electrically conductive textile fibers may be simultaneously utilized for antistatic and/or electromagnetic interference protection, or as a flexible antenna for wireless communication devices.

Figure 6A:
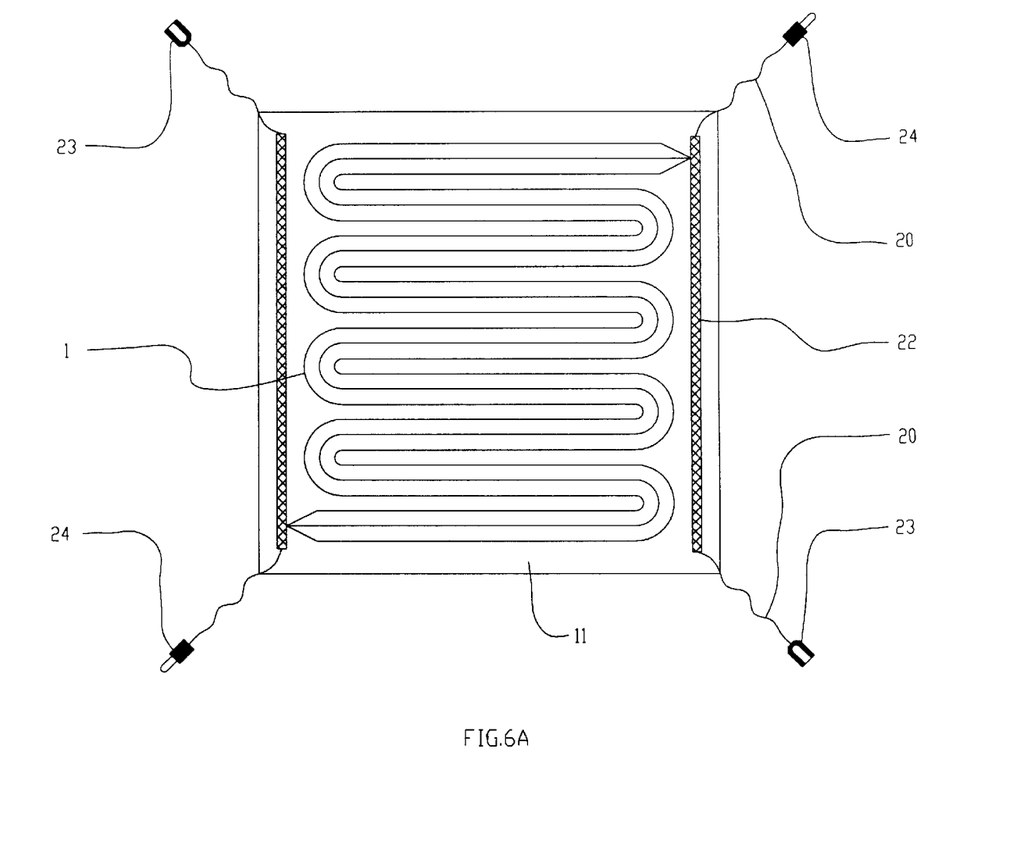
FIG. 6A shows a plan view of a section of a heating tile, which can be electrically connected in parallel or in series with other heating tiles and a power supply source.
Figure 6B:
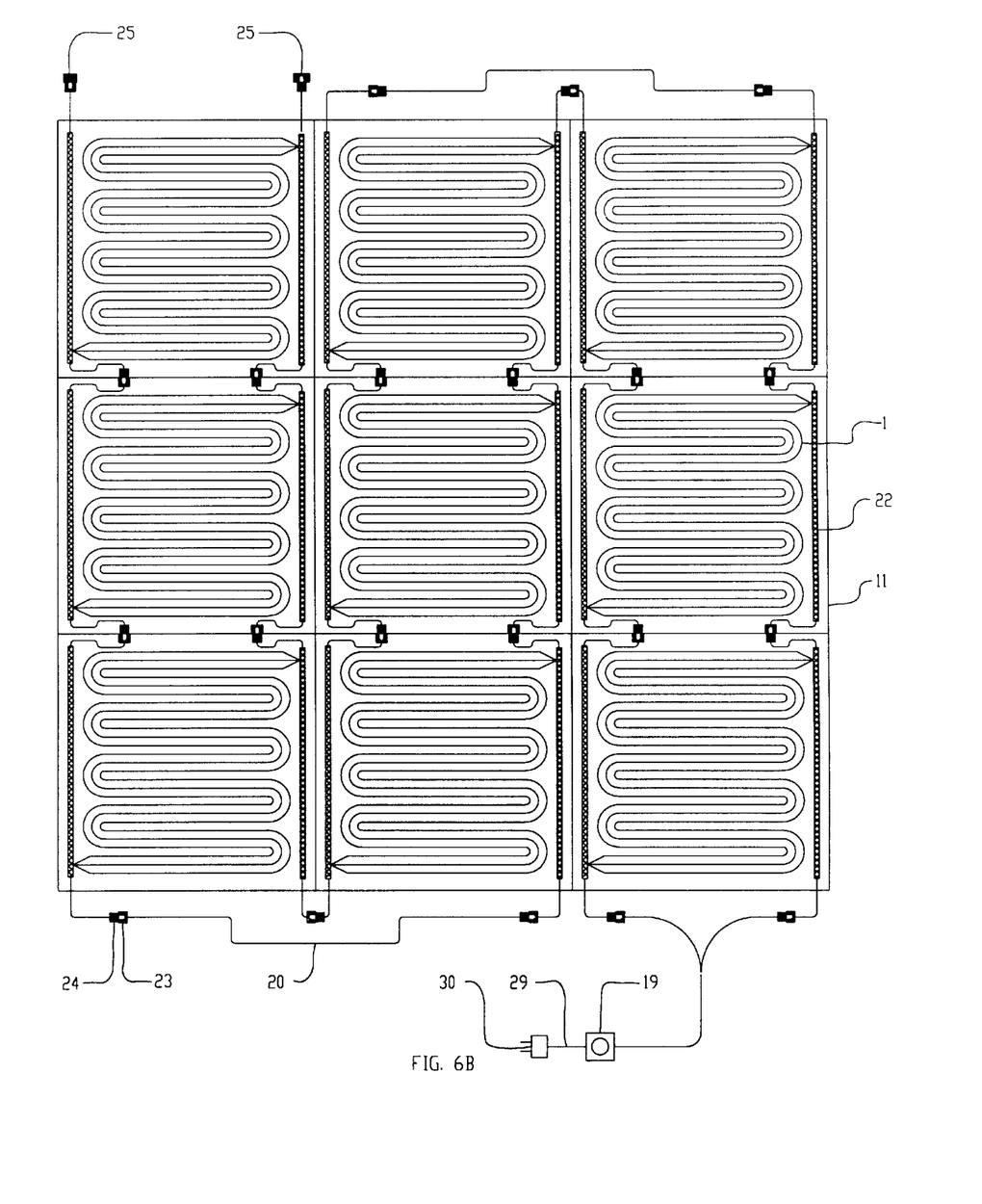
FIG. 6B shows a plan view of a complete modular heating tile assembly.

FIG. 6A and FIG. 6B show examples of commercial applications of this invention in modular heating tiles. FIG. 6A describes a single heating tile in a form of a heating sheet (11), comprising heating cables (1), bus electrodes (22), lead wire cables (20), female (23) and male (24) quick connectors. The heating element can be attached to or molded inside the tile to provide maximum durability and safety.

FIG. 6B demonstrates an example of connecting multiple heating tiles in a continuous heating module. The unused quick connectors at the end of the heating module are covered with electrical insulating caps (25). The whole heater is connected to an electrical power source and can be regulated with an optional power control regulator. Temperature sensors can be connected directly to the heater. In residential or commercial building applications the power control regulator can be connected to a room thermostat, to control temperature level.

Further, the use of electrically conductive threads/fibers in various optional heating embodiments has the following advantages:

- it enables manufacturing of thin, flexible and soft heaters,
- it provides high durability of the heaters due to their ability to withstand sharp folding, small perforations, punctures and compression without decreasing of electrical operational capabilities;
- it provides high wear and tear resistance owing to: (a) high strength of the electrically conductive threads/fibers and (b) optional tight enveloping around all electrically conductive media with strong nonconductive means;
- it provides for manufacturing of corrosion and erosion resistant heaters owing to: (a) high chemical inertness of the carbon coated inorganic threads and ceramic yarns, (b) hermetic polymer insulation of the whole heater, temperature sensors, terminal connections and temperature control devices, for utilization in chemically aggressive industrial or marine environments;
- it provides for saving of electric power consumption owing to its low temperature density and its ability to be placed closer to the heated surface with less cushioning and insulation, thereby promoting faster warm-up;
- it offers versatility of form, shape and insulating properties and therefore suitability for a wide range of heating applications owing to its compatibility with a diversity of manufacturing techniques and processes including but not limited to weaving, stitching, knitting, extrusion and lamination;
- it allows for manufacturing of heaters in various configurations in parallel or in series;
- it overcomes the problem of overheated spots owing to (a) high heat radiating surface area of the heating means, (b) utilizing of temperature sensors placed close to the heater, (c) utilizing of the electrically conductive textile fibers with low melting temperature;
- it provides for extremely low thermal expansion of the heater owing to the nature of the electrically conductive threads, polymer or nonconductive yarns/fibers. This feature is extremely important for construction applications (Example: concrete or steel beams) or for multi-layer insulation with different thermal expansion properties;
- it offers a high degree of flexibility and/or softness of the heater, depending on the type and thickness of insulation; and
- it provides technological simplicity of manufacturing and assembling of said heating elements.

The aforementioned description comprises different embodiments, which should not be construed as limiting the scope of the invention but as merely providing illustrations of some of the presently preferred embodiments of the invention.

While the foregoing invention has been shown and described with reference to a number of preferred embodiments, it will be understood by those possessing skill in the art that various changes and modifications may be made without departing from the spirit and scope of the invention.

What is claimed is:

1. A soft and flexible heater having a durable construction for incorporation into a plurality of articles, said heater comprising at least one continuous melting fuse, said melting fuse comprising at least one electrically conductive textile fiber, encapsulated by at least one layer of nonconductive means to form at least one continuous heating cable, said at least one electrically conductive textile fiber melts at the temperature above 120° C. and below 350° C. terminating electrical continuity in said heating cable and preventing fire hazard in said soft and flexible heater.

2. The soft and flexible heater according to claim 1, wherein said heating cable comprises at least one inner polymer insulating layer and one outer polymer insulating layer.

3. The soft and flexible heater according to claim 2, wherein said outer insulating layer has higher melting temperature than melting temperature of said at least one inner insulating layer.

4. The soft and flexible heater according to claim 1, comprising a power control regulator and at least two of said heating cables, said at least two heating cables are connected through said power control regulator in such manner so as to alternatively provide a single cable and multiple cable electrical connection to vary electrical power output in said heater.

5. The soft and flexible heater according to claim 4, wherein said at least two heating cables have similar electrical resistance.

6. The soft and flexible heater according to claim 4, comprising at least three said heating cables with similar electrical resistance to provide alternative low, medium and high power output in said heater.

7. The soft and flexible heater according to claim 4, wherein said at least two heating cables have different electrical resistance to provide alternative multi-level variations of power output in said heater.

8. The soft and flexible heater according to claim 4, wherein said at least two heating cables are combined with at least one nonconductive means having the form of a sheet.

9. The soft and flexible heater according to claim 4, wherein said at least two heating cables are combined with at least one nonconductive means to form a continuous heating tape.

10. The soft and flexible heater according to claim 4, wherein said at least two heating cables are combined with at least one nonconductive means to form heating sleeve of continuous cross section.

11. The soft and flexible heater according to claim 1, wherein said at least one heating cable is attached to at least one layer of nonconductive means by a shape holding means to form a heating sheet.

12. The soft and flexible heater according to claim 11, wherein said heating sheet comprises at least two heating cables, electrically connected in parallel and separated from each other by at least one nonconductive means.

13. The soft and flexible heater according to claim 1, comprising at least two of said heating cables combined with nonconductive means to form a continuous heating tape of predetermined length, said at least two heating cables are separated by said nonconductive means and electrically connected with each other in series at the end of said heating tape.

14. The soft and flexible heater according to claim 1 further including at least one continuous temperature sensor, encapsulated by nonconductive means, said temperature sensor is electrically connected to an electronic device to control and vary power output in said heater.

15. The soft and flexible heater according to claim 1 further including at least one fiber optical filament as a temperature sensor, connected to an electronic device to control and vary power output in said heater.

16. The soft and flexible heater according to claim 1 further including at least one electrode terminal comprising at least one terminal insert which penetrates through said at least one layer of nonconductive means and electrically connects with said at least one electrically conductive textile fiber.

17. The soft and flexible heater according to claim 16 further including at least one terminal lock to secure electrical connection in said electrode terminal.

18. A soft and flexible heater having a durable construction for incorporation into a plurality of articles, said heater comprising:
at least one continuous heating cable comprising at least one electrically conductive textile fiber as heating means,
at least one electronic power control regulator to control temperature and to vary electrical power output in said heater,
at least one continuous temperature sensor, electrically connected to said electronic power control regulator to provide a signal of temperature change in said heater.

19. The soft and flexible heater according to claim 18, wherein said at least one continuous heating cable and said at least one continuous temperature sensor are combined together in one temperature sensing heating cable.

20. The soft and flexible heater according to claim 18, wherein said at least one electrically conductive textile fiber is connected to said electronic power control regulator and acts simultaneously as said heating means and said temperature sensor.

21. The soft and flexible heater according to claim 19, wherein said at least one electrically conductive textile fiber is connected to said electronic power control regulator and acts simultaneously as said heating means and said temperature sensor.

22. The soft and flexible heater according to claim 18, wherein said at least one continuous heating cable is separated from said at least one continuous temperature sensor by at least one gap.

23. The soft and flexible heater according to claim 18, wherein said at least one continuous heating cable and said at least one continuous temperature sensor are combined with nonconductive means having the form of a tape.

24. The soft and flexible heater according to claim 18, wherein said at least one continuous heating cable and said at least one continuous temperature sensor are combined with nonconductive means having the form of a sheet.

25. The soft and flexible heater according to claim 18, wherein said at least one continuous heating cable and said at least one continuous temperature sensor are combined with nonconductive means having a form of a sleeve of continuous cross section.

26. A soft and flexible heating tape having a durable construction for incorporation into a plurality of articles, said heating tape comprising:
at least one electrically conductive textile fibers, encapsulated by a plurality of layer of nonconductive means to form at least two heating cables,
said at least two heating cables are electrically connected with each other in series at the end of said heating tape.

27. A soft and flexible heater having a durable construction for incorporation into a plurality of articles, said heater comprising:
at least two heating cables each of which is comprised of at least one electrically conductive textile fiber, encapsulated by at least one layer of nonconductive means,
said at least two heating cables are sandwiched between at least two strips of nonconductive means, which are attached to each other to hold said at least two heating cables in predetermined place.

28. A soft and flexible heater having a durable construction for incorporation into a plurality of articles, said heater comprising:
at least two heating cables each of which is comprised of at least one electrically conductive textile fiber, encapsulated by at least one layer of nonconductive means,
said at least two heating cables are sandwiched between at least two sheets of nonconductive means, which are attached to each other to hold said at least two heating cables in predetermined place.

* * * * *